US006086724A

United States Patent [19]

Nakatani et al.

[11] Patent Number: 6,086,724

[45] Date of Patent: Jul. 11, 2000

[54] METHOD FOR FORMING PARTICULATE REACTION AND MEASURING METHOD THEREOF

[75] Inventors: Kiyoharu Nakatani, Kyoto; Hiroaki Misawa, Takatsuki; Noboru Kitamura, Kyoto; Tatsuya Uchida, Ichihara, all of Japan

[73] Assignee: Research Development Corporation of Japan, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/453,776

[22] Filed: May 30, 1995

Related U.S. Application Data

[63] Continuation of application No. 08/041,313, Mar. 31, 1993, abandoned.

[30] Foreign Application Priority Data

Apr. 3, 1992 [JP] Japan ..................................... 4-82525

[51] Int. Cl.[7] ..................................................... C07B 61/00

[52] U.S. Cl. .................... 204/157.15; 204/400; 205/335; 205/337; 205/775; 324/71.1; 324/71.4; 324/72; 324/425

[58] Field of Search ............................... 204/157.15, 400; 205/335, 337, 775; 324/71.1, 71.4, 72, 425

[56] References Cited

U.S. PATENT DOCUMENTS

| | | | |
|---|---|---|---|
| 3,783,117 | 1/1974 | Bean | 204/180 R |
| 4,097,153 | 6/1978 | DeRemigis | 204/180 R |
| 4,113,596 | 9/1978 | Treille et al. | 204/180 R |
| 4,242,194 | 12/1980 | Steiner et al. | 204/299 R |
| 4,395,312 | 7/1983 | McCreery et al. | 204/400 |
| 4,591,550 | 5/1986 | Hafeman et al. | 435/4 |

OTHER PUBLICATIONS

WPIDS DNN N89–228116, Benderskii et al., SU 1469432 A (Abstract), Mar. 30, 1989.

*Primary Examiner*—Cecilia J. Tsang
*Assistant Examiner*—C. Delacroix-Muirheid
*Attorney, Agent, or Firm*—Wenderoth, Lind & Ponack, L.L.P.

[57] ABSTRACT

Particulates are trapped by laser beam and brought into contact with electrodes to electrochemically and spectroscopically measure the reaction process thereof.

Precise measurement of the process of chemical reactions such as electrochemical and photochemical ones of a single particulate is made possible.

2 Claims, 3 Drawing Sheets

METHOD FOR FORMING PARTICULATE REACTION AND MEASURING METHOD THEREOF

This application is a continuation of now abandoned application, Ser. No. 08/041,313, filed Mar. 31, 1993, now abandoned.

FIELD OF THE INVENTION

The present invention relates to a method for forming particulate reaction and a measuring method thereof. More particularly, the present invention relates to a method for forming particulate reaction, useful in various fields including microelectronics, biotechnology and materials science and a measuring method of reaction for measuring the reaction process electrochemically and spectroscopically.

PRIOR ART

In various fields including microelectronics, biotechnology and materials science, it has often been necessary to study reactions in micro-regions, and techniques for this purpose have been examined.

In general, however, it is very difficult to control particulate reactions at a level of particulates along by microscopic techniques, and furthermore, to measure these particulate reactions. It has therefore been the conventional practice to use a macroscopic technique of introducing the time factor and calculating the measured value for one particulate from the process of reactions for a certain period of time by means of a calculation formula.

However, because the time factor is introduced in this technique, and the reactions cannot be determined in terms of the macroscopic correlation with time, this macroscopic technique is not suitable for a case requiring a more strict measurement.

A method known as laser trapping which traps each of particulates of the micrometric order by laser beam was developed by the present inventors, and efforts are being made to expand the scope of application thereof for transportation, reforming and reaction of particulates.

This method is attracting the general attention as a micromanipulation technology, and epochmaking techniques are also proposed for formation of active patterns by groups of particulates, processing thereof, and manipulation of metal particulates.

These techniques now permit non-contact free operations such as trapping, migration and processing of particulates or groups of particulates.

In spite of these achievements, however, control and measurement regarding the reaction process of particulates are still insufficient, so that searching for reactions in microscopic regions has been limited to a certain extent.

SUMMARY OF THE INVENTION

The present invention has therefore an object to provide a novel means which can generate a reaction of even a single particulate by a microscopic technique and measurement of the reaction process thereof.

The present invention provides a method for performing reactions of particulates, which comprises the steps of trapping particulates through irradiation with a laser beam and bringing them into contact with electrodes to perform an electrochemical reaction thereof, and a method for measurement of particulates, which comprises the steps of bringing the particulates trapped by irradiation of the laser beam into contact with the electrodes to electrochemically measure the reaction process of the particulates, and in parallel with this, conducting microscopic spectroscopic measurement.

Figure 1:
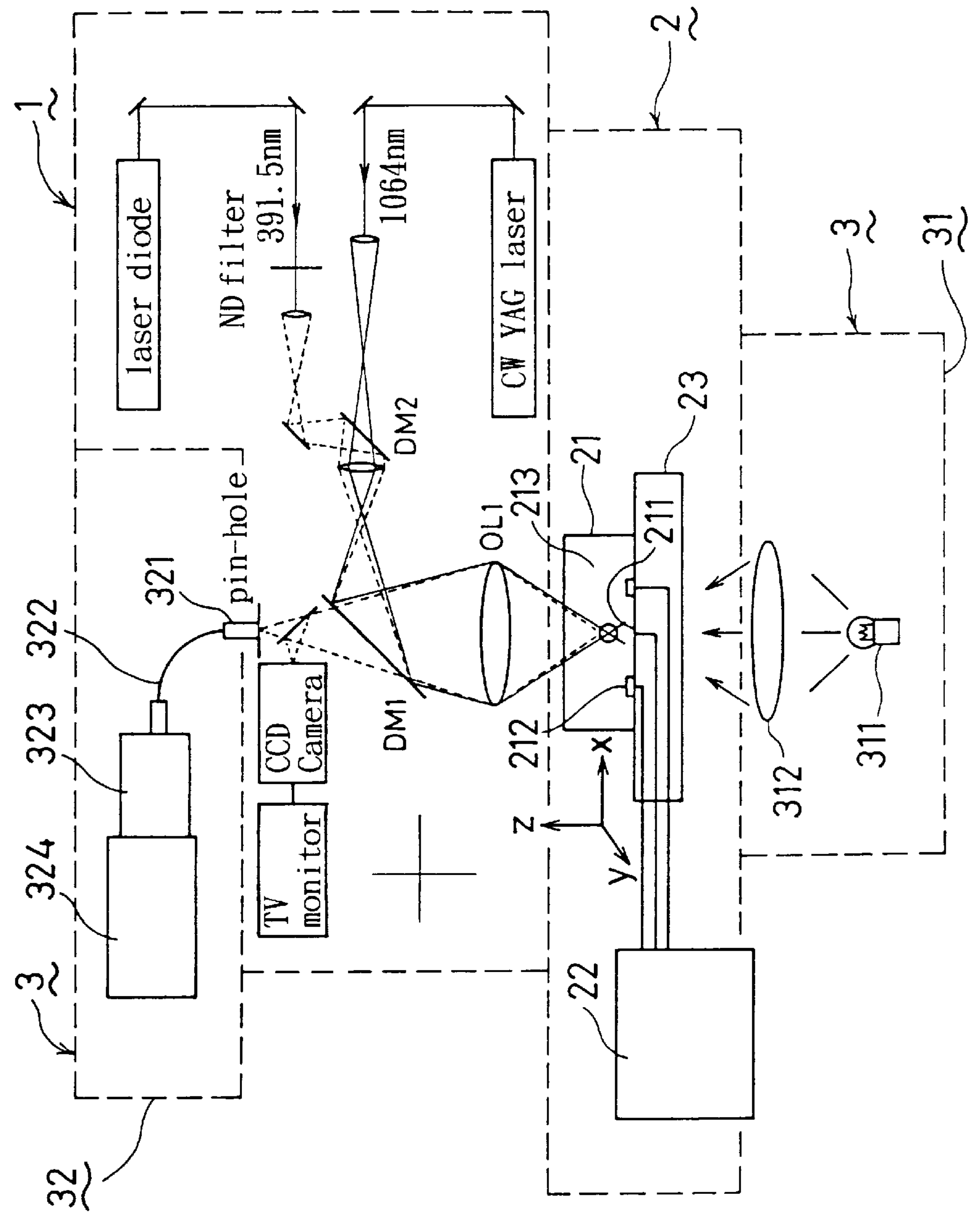
FIG. 1 illustrates a schematic view indicating an apparatus used for the present invention.

The symbols in FIG. 1 represent the following items, respectively;

1: laser beam particle manipulator,
2: electrochemical reaction meter,
21: reaction chamber,
211: operating electrode,
212: opposite electrode,
213: reference electrode,
22: potentiostat,
23: 3D scanning table,
3: photochemical reaction meter,
31: light irradiator,
311: light source,
312: condenser lens,
32: photodetector,
321: pinhole,
322: optical fiber,
323: polychrometer,
324: detector.

DETAILED DESCRIPTION OF THE INVENTION

In the present invention, particulates are trapped by means of a laser beam, and the trapped particulates are brought into contact with electrodes. In this state in which the particulates are in contact with the electrodes, chemical reactions such as electrochemical and photochemical reactions are caused in order to electrochemically and spectroscopically measure the reaction process.

In the present invention, it is possible, for example, to control and measure the amount of electrolytic reaction through monitoring of the total quantity of electricity in constant-potential electrolysis, and also to clarify details of the reaction process through simultaneous observation by using the spectroscopic technique in parallel with this. There is no limitation on the kind of reaction or particulates, but any one may be selected.

In an electrochemical measuring method, measurement of current or voltage, or the quantity of electricity during the electrochemical reaction permits quantitative determination in the form of numerical values or a graph. More specifically, applicable techniques include cyclic voltammetry, the potential step method and pulse voltammetry.

It is also possible to measure fluorescence spectra and fluorescent time response with a time resolution of the order of $10^{-9}$ seconds to $10^{-12}$ seconds and to measure the absorption spectrum with a time resolution of the order of $10^{-6}$ seconds by the application of the spectroscopic measuring method.

FIG. 1 illustrates a typical microscopic spectrochemical reaction meter as one of the examples of the present invention. As shown in FIG. 1, the microscopic spectrochemical reaction meter may comprise a laser beam particulate manipulator (1), an electrochemical reaction meter (2), and a spectrochemical reaction meter (3) as an embodiment.

In the particulate manipulator (1), a CW (continuous wave) $Nd^{3+}$; YAG (Yttrium aluminum garnet) laser (wavelength=1,064 nm) is used as the laser for trapping particulates, and a picosecond semiconductor laser (wavelength=391.5 nm) is used for exciting fluorescent pigment. These laser beams are directed through a lens system toward a microscope (Nikon Optiphot XF) and condensed through a 100-magnification very-long-operating objective lens onto the sample.

The particulate manipulation is observed through a CCD (charge-coupled-device) camera and a television monitor. The position of the laser beams, and actual operations are displayed in a superimposed form on the monitor screen.

On the other hand, the electrochemical reaction meter (2) may comprise a reaction chamber (21), a potentiostat (22), and a 3D scanning table (23) as an embodiment. The reaction chamber (21) has operating electrodes (211), an opposite electrode (212), and a reference electrode (213). The potentiostat is connected by a conductor to the individual electrodes and can provide each electrode with a potential difference.

As the operating electrodes (211), for example, a microelectrode for electrochemical reaction and a large electrode for photochemical reaction may be employed. As the microelectrode, for example, a gold wire having a diameter of 10 μm may be insulation-secured with silicone adhesive onto a sliding glass, leaving a portion with a diameter of 10 μm and a length of up to 50 μm. Normal working of this electrode may be confirmed through CV (cyclic voltammetry) carried out in $10^{-4}$ mol aqueous solution of potassium ferricyanide. As the large electrode, for example, an $SnO_2$ transparent electrode having a width of 6 mm and a length of 30 mm may be employed.

In addition to gold, any electrode including a platinum, silver or semiconductor electrode, which is used for usual electrochemical purposes, may be applicable. An $SnO_2$ electrode-transparent semiconductor electrode may be used, so far as it is a microelectrode, not only for spectroscopic measurement but also for electrochemical measurement, and spectroscopic measurement is possible even with an electrode of gold, for example.

The operating electrode may be of any shape, in addition to the line electrode manually prepared as described above, irrespective of the method of preparation, including a band electrode prepared by lithographic technique or an array electrode.

A platinum electrode may be used as the opposite electrode (212), and a silver/silver chloride electrode may be used as the reference electrode (213).

Any electrode which is used for usual electrochemical purposes such as a calomel electrode may be used as the reference electrode, apart from the silver/silver chloride one. Any electrode which is used for electrochemical purposes such as gold may be employed as the opposite electrode, in addition to the platinum one.

The 3D scanning table (23) is contact-secured onto the bottom of the reaction chamber (21), and movable three-dimensionally under the action of a power source such as a motor. It is therefore possible to select any particulates in the reaction chamber and to manipulate only the selected particulates by means of a laser.

The photochemical reaction meter (3) may comprise, for example, a light irradiator (31) located on the lower surface of the electrochemical reaction meter (2), and a photodetector (32) located on the upper surface of the electrochemical reaction meter (2), as an embodiment.

The light irradiator (31) comprises, for example, a light source (311) and a condenser lens (312); light generated from the light source (311) passes through the 3D scanning table (23) and is irradiated to the sample in the reaction chamber. As the light source (311), for example, fluorescence, infrared or ultraviolet may be used.

The photodetector (32) may comprise, for example, a pinhole (321), an optical fiber (322), a polychrometer (323), and a detector (324), and the light having been transmitted through the sample passes through the pinhole (321) and the optical fiber (322), and is analyzed by the polychrometer (323) and the detector (324).

Now, the present invention will be described further in detail by means of examples.

EXAMPLE 1

Using the system configuration as in FIG. 1, an electrochemical reaction was caused by inserting oil drops as particulates into the water phase of the reaction chamber to measure the reaction process.

The oil drops used were prepared by dissolving ferrocene in an amount of 0.1 mol as an electroactive substance and tetrabutyl ammonium tetraphenyl phosphate (TBATPE) in an amount of 0.01 mol as a hydrophobic support electrolyte into tri-n-butyl phosphate and mixing the resultant solution with 0.2 mol of water-phase KCl at a gravimetric fraction of oil phase of 1%.

A single oil drop was trapped by the laser beam particulate manipulator (1) and brought into contact with the operating electrodes (211). Then, the potential between the electrodes was caused to continuously linear-sweep by means of the potentiostat (22) to determine the relationship between the electrode potential and the current density. The electrode potential was varied at intervals of 20 mV persecond. The electrode potential had an initial value of 0 mV. The reaction was performed for a period of 40 seconds. The resultant linear sweep voltammogram (LSV) was as shown in FIG. 2.

Figure 2:
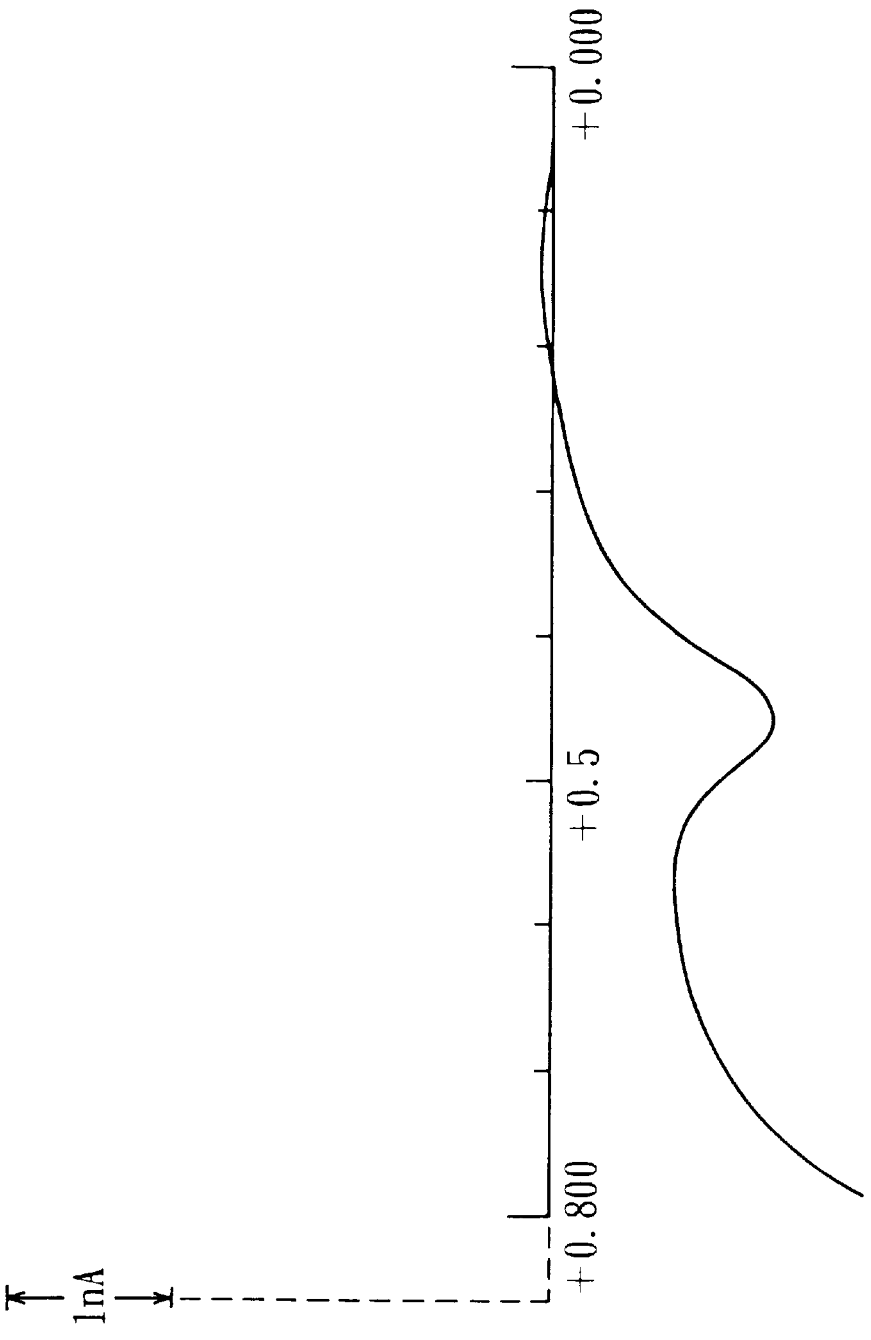
FIG. 2 illustrates the results of measurement of potential in an example using the method of the present invention.

As is clear from the results shown in FIG. 2, a peak is observed at about 0.5 V with a corresponding current of $1.45\times10^{-3}$.

For electrochemical reaction, ferrocene and other appropriate compounds such as tetracyanoquinodimethane or N, N, N', N'-tetramethyl-p-phenylenediamine is applicable in any manner so far as the compound has an oxidation-reduction potential within the range in which the solvent, the oil drop or the particulate is not electrolyzed.

This compound may be one which is not completely mixed with water, such as tri-n-butyl phosphate, nitrobenzene, or benzylalcohol and forms liquid drops, or a polymer particulate such as polystyrene or polymethyl methacrylate.

EXAMPLE 2

Chemical reactions were simultaneously observed by using constant-potential electrolysis and a spectroscopic technique, to approximately determine the amount of electrolysis and the electrolytic rate.

The fluorescence spectroscopic method was used. The sample comprised the oil phase and oil drops used in the Example 1, and in addition, dissolved $5\times10^{-3}$ mol 9, 10 diphenyl anthracene (DPA).

An $SnO_2$ transparent electrode was used as the large electrode for photochemical reaction. Oil drops were brought into contact with the $SnO_2$ transparent electrode by means of the laser beam particulate manipulator.

Figure 3:
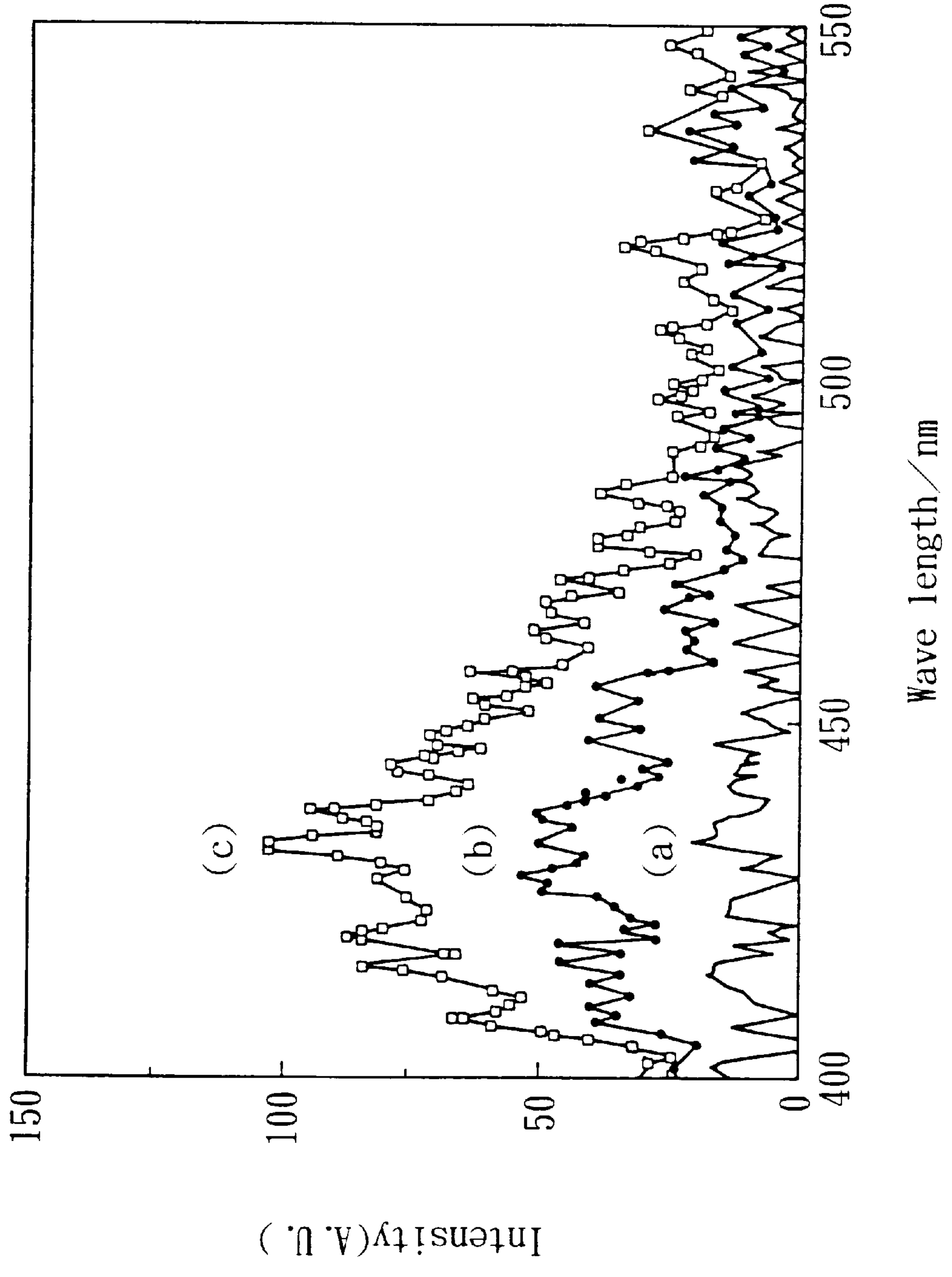
FIG. 3 illustrates a fluorescent intensity indicating the results of an example using the apparatus of the present invention.

Measurement of LSV with the $SnO_2$ electrode as in the Example 2 was able to observe a peak near a potential close to that in FIG. 2, while depending upon the potential sweep rate. With the potential kept at 0.6 V, oil drops, having a diameter of 25 $\mu$m, in contact with the $SnO_2$ electrode was subjected to a fluorescent analysis. This gave the relationship between the fluorescence wavelength and the fluorescent intensity, with the constant-potential electrolytic time as the parameter. The results are as shown in FIG. 3. In FIG. 3, the abscissa represents the fluorescence wavelength, and the ordinate represents the fluorescent intensity: (a) is before electroly sis, (b) is 425 seconds after electrolysis, and (c) is 825 seconds after electrolysis.

Along with the progress of electrolysis, the fluorescent intensity of DPA increases. While fluorescence of DPA disappears under the effect of ferrocene, the decrease in concentration in oil drops of ferrocene electrolyzed at the electrode is considered to lead to a higher fluorescent intensity.

By using such a fluorescent probe, it is possible to estimate the electrolytic rate in oil drops. With the $SnO_2$ transparent electrode, substantially complete electrolysis of ferrocene in oil drops required a period of almost 1,000 seconds. However, since this is attributable to the low electron migration rate of this electrode as compared with that with a gold electrode, electrolysis is estimated to require a shorter period, i.e., about 300 seconds at the most, with a gold microelectrode.

According to the present invention, as described above in detail, it is possible to perform chemical reactions of a single particulate such as electrochemical and photochemical reactions, and to closely measure the reaction process thereof. This technique will surely be useful for searching for the reaction system in microregions.

What is claimed is:

1. A method of measuring the progress of an electrochemical reaction of an electroactive substance having an oxidation-reduction potential in a particle in a liquid medium in which a pair of electrodes are immersed therein which comprises trapping the particle suspended in the liquid medium by irradiating a laser beam onto the particle, bringing said trapped particle into contact with one of said electrodes, electrolyzing the electroactive substance in the particle, and measuring the amount of electrolysis and the electrolytic rate by measuring an electrode potential and a current density between said pair of electrodes while said trapped particle is in contact with the electrode to thereby determine the progress of the reaction.

2. A method according to claim 1 wherein the electrode potential is varied and the current density is measured to monitor the reaction.

* * * * *